United States Patent
Reinicke

(10) Patent No.: US 6,973,773 B2
(45) Date of Patent: Dec. 13, 2005

(54) PROPELLANT SUPPLY DEVICE

(75) Inventor: Robert H. Reinicke, Mission Viejo, CA (US)

(73) Assignee: Moog Inc., East Aurora, NY (US)

( * ) Notice: Subject to any disclaimer, the term of this patent is extended or adjusted under 35 U.S.C. 154(b) by 268 days.

(21) Appl. No.: 10/100,780

(22) Filed: Mar. 19, 2002

(65) Prior Publication Data

US 2003/0177757 A1 Sep. 25, 2003

(51) Int. Cl.[7] .............................................. F02K 9/50
(52) U.S. Cl. .................... 60/229; 60/259; 60/39.48; 220/530; 244/135 R
(58) Field of Search ........................ 60/39.48, 229, 60/259; 137/255, 262, 264; 220/412, 414, 415, 530, 581, 585; 222/386, 386.5, 389; 244/135 R, 135 B

(56) References Cited

U.S. PATENT DOCUMENTS

| | | | | |
|---|---|---|---|---|
| 3,127,743 A | * | 4/1964 | Kern ........................ | 60/39.48 |
| 3,208,358 A | * | 9/1965 | Harms et al. ............... | 60/39.48 |
| 3,222,498 A | * | 12/1965 | Miksch ...................... | 60/39.48 |
| 3,275,418 A | * | 9/1966 | Nee .......................... | 60/39.48 |
| 3,614,026 A | | 10/1971 | Montanino et al. | |
| 5,640,844 A | | 6/1997 | Pahl | |
| 5,823,478 A | | 10/1998 | Dunn | |
| 5,961,074 A | | 10/1999 | Dunn | |

* cited by examiner

*Primary Examiner*—Louis J. Casaregola
(74) *Attorney, Agent, or Firm*—Phillips Lytle LLP

(57) ABSTRACT

A propellant supply device (10) is provided for a vehicle (11) having a main propulsion motor (12) and having an attitude control system (11) including a plurality of thrusters (14A, 14B, 14C, . . . , 14F). The improved device comprises: a pressure vessel (15); first and second movable walls (20, 21) operatively arranged within the pressure vessel and dividing the interior space therewithin into three separate sealed chambers (22, 23, 24) from each of which fluid may be supplied; a first fluid (e.g., a first bipropellant) in one of the chambers; a second fluid (e.g., a second bipropellant) in a second of the chambers; and a third fluid (e.g., ammonia) in a third of the chambers, the third fluid being a volatile liquid having a liquid phase and a gaseous phase, and wherein all three chambers are pressurized to the vapor pressure of the third fluid.

13 Claims, 3 Drawing Sheets

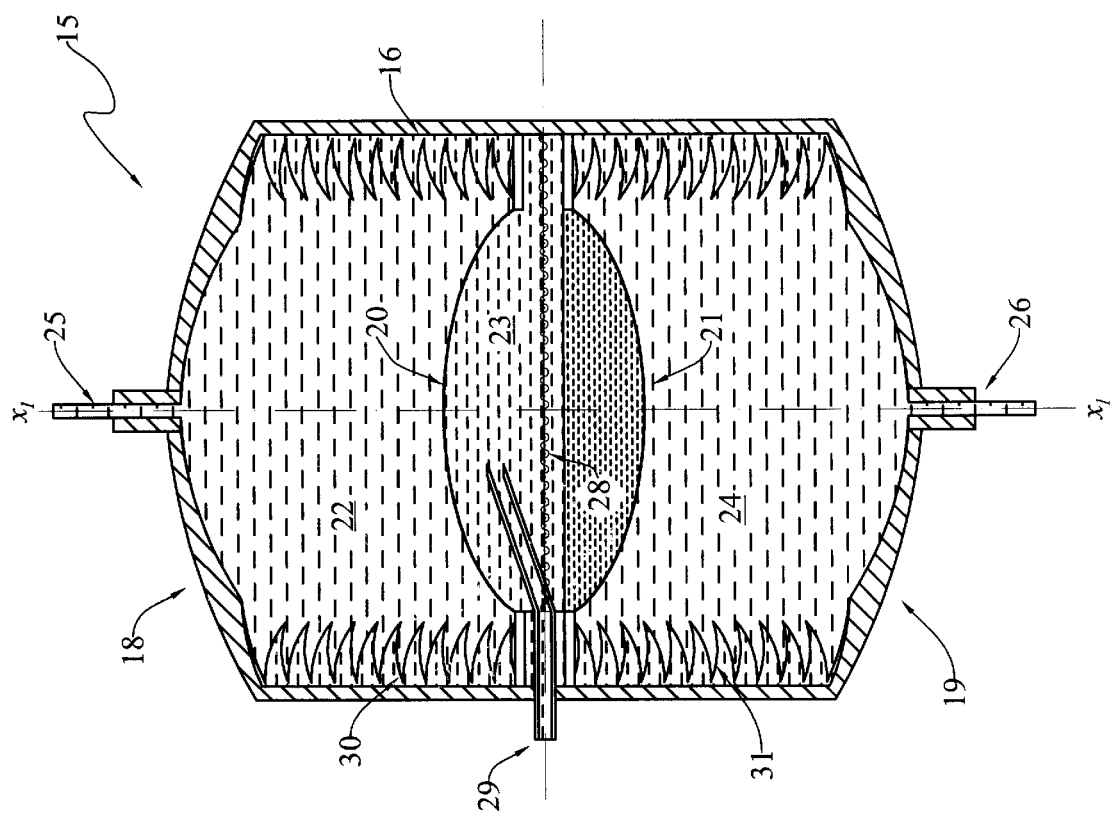

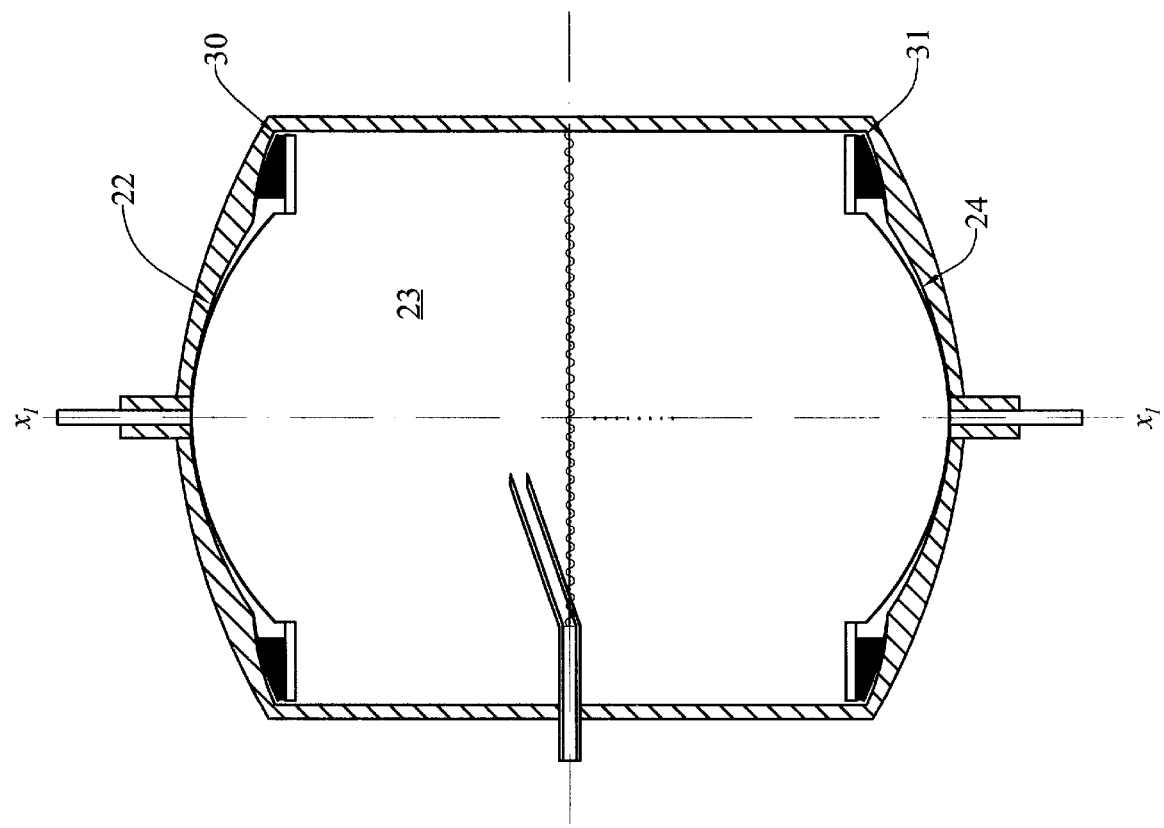

US 6,973,773 B2

PROPELLANT SUPPLY DEVICE

TECHNICAL FIELD

The present invention relates generally to aerospace vehicles and the like, and, more particularly, to an improved propellant supply device for an aerospace vehicle having a main propulsion motor and having an attitude control system, including a plurality of thrusters.

BACKGROUND ART

Satellites typically have an orbit-raising ("OR") propulsion system, and an attitude control system ("ACS"). A main rocket motor using liquid bipropellants (i.e., a fuel and an oxidizer) is commonly used to provide major position and velocity changes, such as the raising of a satellite into a desired orbit. It is also known to selectively dispense a stored gas propellant through the thrusters to alter the in-flight attitude of the vehicle. It is further known to use a volatile liquid (e.g., ammonia), having a liquid phase and a gaseous phase, to pressurize the bipropellants.

It would be desirable to reduce the amount of structure and weight in a launchable vehicle. A rule of thumb is that such a vehicle costs $5,000 per kilogram to build, and $10,000 per kilogram to launch.

It would also be generally desirable to provide an improved propulsion system that is of low cost; that is structurally simple; that is lightweight and compact; and that has a substantially fixed center of gravity, even as propellants are dispensed.

DISCLOSURE OF THE INVENTION

With parenthetical reference to the corresponding parts, portions or surfaces of the disclosed embodiment, merely for purposes of illustration and not by way of limitation, the present invention provides a propellant supply device (10) for a vehicle (11), such as a spacecraft, having a main propulsion motor (12) and having an attitude control system (13) including a plurality of thrusters (14A, 14B, . . . , 14F).

The propellant supply device broadly comprises: a pressure vessel (15); first and second movable walls (20, 21) operatively arranged within the pressure vessel and dividing the interior space therewithin into three distinct and separated chambers (22, 23, 24), from each of which fluid may be dispensed; a first fluid (e.g., one bipropellant, a monopropellant, etc.) in one of the chambers; a second fluid (e.g., another bipropellant, a monopropellant, etc.) in a second of the chambers; and a third fluid (e.g., ammonia) in a third of the chambers, the third fluid being a volatile liquid having a liquid phase and a gaseous phase, and wherein all three chambers are pressurized to the vapor pressure of the third fluid.

In one form, the third chamber is arranged between the movable walls, and the first and second fluids are bipropellants that are supplied to the main propulsion motor in a constant volumetric flow rate ratio. The gaseous phase of the third fluid may be supplied to the thrusters for controlled discharge therethrough as jets. The movable walls preferably have the same effective spring rate and the same effective area. Each movable wall may be a bellows. The movable walls are preferably so configured and arranged that the first and second fluid are pressurized equally by the third fluid. The first and second fluids may be the same, such as a monopropellant, and, in this case, the propellant supply device is so configured and arranged that its center of gravity remains substantially fixed as the first and second fluids are dispensed at equal flow rates.

Accordingly, the general object of the invention is to provide an improved propellant supply device for a vehicle having a main propulsion motor and having an attitude control system, including a plurality of thrusters.

Another object is to provide an improved propellant supply device in which two propellant fluids (e.g., bipropellants, a monopropellant, etc.) are pressurized equally.

Another object is to provide an improved propellant supply device in which the center of gravity of the device remains substantially constant as propellant fluids are discharged therefrom.

Another object is to employ a third fluid that serves both as (a) a volatile pressurant to expel the other two fluids, and (b) a gaseous propellant supply for the array of thrusters.

Still another object is to provide an improved propellant supply device in which the ratio of two bipropellant flows is maintained substantially constant as such fluids are discharged.

These and other objects and advantages will become apparent from the foregoing and ongoing written specification, the drawings and the appended claims.

BRIEF DESCRIPTION OF THE DRAWINGS

FIG. 2 is an enlarged detail view of the pressure vessel shown in FIG. 1.

FIG. 3 is a schematic view of a second form of the improved pressure vessel.

DESCRIPTION OF THE PREFERRED EMBODIMENTS

Figure 1:
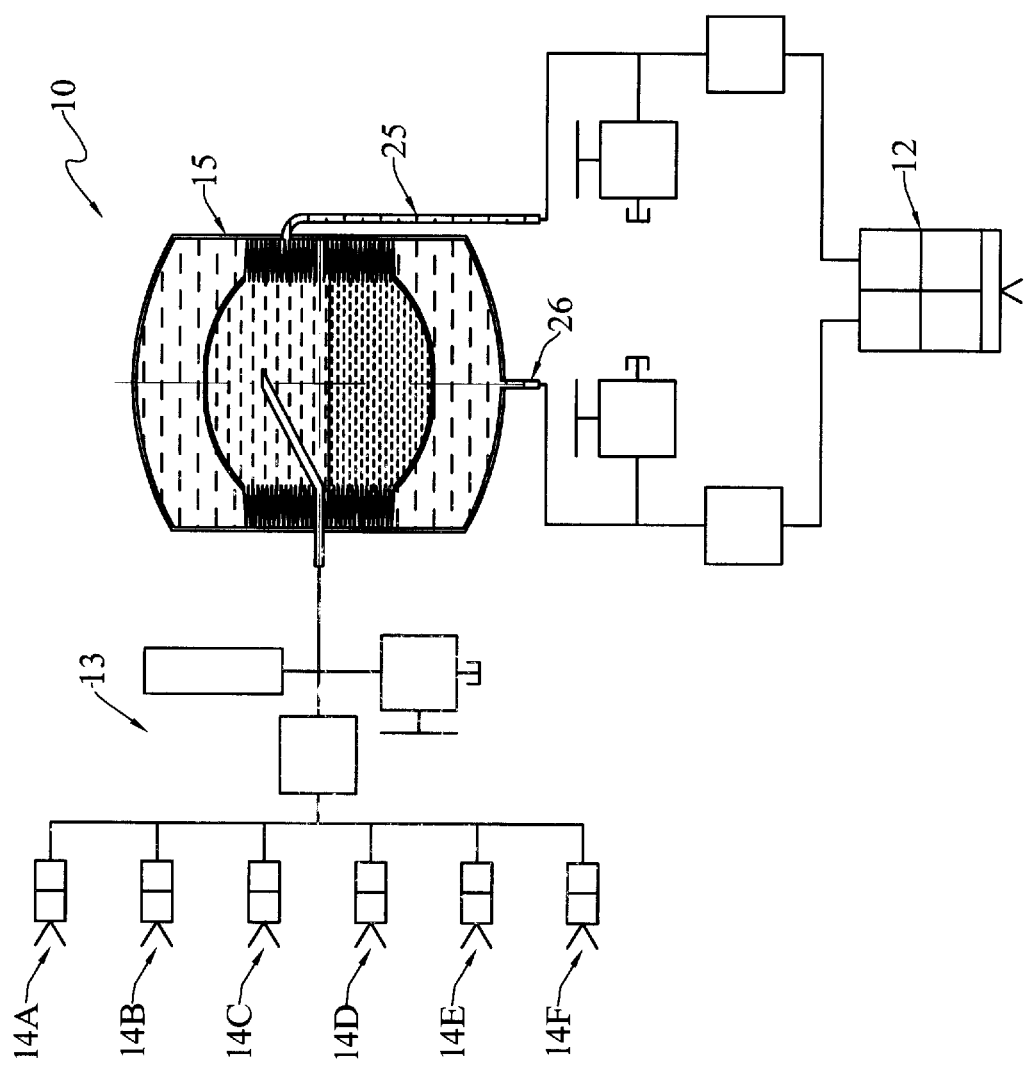
FIG. 1 is a schematic view of the improved propellant supply device for a vehicle.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to FIG. 1, the present invention broadly provides a propellant supply device, generally indicated at 10, for a satellite, spacecraft, missile or the like, a portion of which is fragmentarily indicated at 11. The vehicle has an axial main propulsion motor 12, and has an attitude control system 13 that includes a plurality of attitude-changing thrusters, severally indicated at 14 and individually identified by the suffixes A, B, C, . . . , F. The system thus requires a source of pressurized gas to be supplied to the attitude-control thrusters, and sources of pressurized liquid fuel and oxidizer to be supplied to the main propulsion motor.

The invention is provided in an improved pressure vessel, embodiments of which are shown in FIGS. 2 and 3. The improved pressure vessel is uniquely designed to provide all three pressurized fluids.

Referring now to FIG. 2, pressure vessel 15 has a vertical axis of elongation $x_1$-$x_1$, and is shown as having a coaxial cylindrical sidewall structure 16. Vehicle axis x-x and pressure vessel axis $x_1$-$x_1$ may be coincident, if desired. The upper and lower ends of this sidewall are suitably closed by domed or rounded end heads 18, 19, respectively, that are suitably secured, as by welding or the like, to the adjacent margins of the sidewall. Two bellows-like movable wall devices, severally indicated at 20, 21, respectively, are operatively mounted within the pressure vessel and subdivide the interior space of the pressure vessel into three separate and distinct sealed chambers, indicated at 22, 23 and 24, respectively.

In one application, upper and lower chambers 22 and 24, which are physically isolated from one another, contain reactive bipropellants. Upper chamber 22 is arranged to supply its propellant via conduit 25 to engine 12. Lower chamber 24 is arranged to supply its propellant via conduit 26 to engine 12. The space between the two movable wall members, indicated at 23, defines the third chamber.

The third chamber contains a volatile liquid having a liquid phase and a gaseous phase. Gas from the third chamber is adapted to be provided via a tube, generally indicated at 29. The volatile fluid may, for example, be ammonia.

The third chamber 23 is divided by a screen 28 separating it into upper and lower portions. Such a screen in a propellant tank is often called a propellant management device ("PMA"). It is usually a woven wire cloth that may have individual openings of about 10 micrometers, which is small enough to ensure that the presence of any liquid coming in contact with the screen will not overcome the surface tension force.

The third chamber 23 is filled initially under normal gravity so that its volatile liquid level is somewhat below the level of screen 28. Although liquid may come in contact with the screen when the spacecraft is in orbit and experiencing "zero gravity", the surface tension force of the screen prevents any passage of liquid. Since the inlet of tube 23 is located on the upper gas-side of the screen, the thrusters are supplied with gas, not liquid.

Thus, the third fluid is operatively arranged within third chamber 23 and acts through movable walls 20, 21 to pressurize chambers 22 and 24, respectively. In the embodiment shown in FIGS. 1 and 3, these chambers are metal bellows that have the same surface area and the same effective spring rate. In fact, they are, for all intents and purposes, identical to one another. Hence, the common third fluid will pressurize the fluids in the first and second chambers equally. This is important so as to maintain constant the ratio of such fluids as are delivered to the rocket engine 12. As fluid from the first and second chambers are withdrawn in equal amounts, the volume of the third chamber expands symmetrically.

FIG. 3 shows third chamber 23 as being fully expanded, and chambers 22 and 24 as being compressed to a minimum volume, with all the liquid propellant expelled. The convolutions of the metal bellows 30, 31 are nested to a minimum axial length. The first and second chambers need not necessarily contain reactive bipropellants. Rather, these chambers could contain a suitable liquid monopropellant. Again, as fluid from the first and second chambers is withdrawn in equal amounts, the volume of the third chamber expands symmetrically, thus keeping the center of gravity of the propellant supply device substantially fixed relative to the spacecraft.

Modifications

The present invention contemplates that many changes and modifications may be made. For example, while it is preferred to use an expanding accordion-like metal bellows as the movable walls, other types of walls, bladders and diaphragms might possibly to used in lieu thereof. As indicated above, the pressurizing third fluid may separate the first and second fluids. In an alternative arrangement, two balloon-like bladders or containers for the first and second fluids may be provided within the enclosure, with suitable conduits leading to the respective thrust-producing devices. In this alternative arrangement, the interior volume of the pressure vessel may itself be charged with the volatile liquid to pressurize the first and second balloon-like containers.

In the claims, preamble language in a claim that is not referred to in the body of that particular claim is to be construed as a statement of intended use, and not as a limitation. Conversely, where the body of a particular claim does refer to language in the preamble of that particular claim, or a claim to which it refers, such preamble language should be regarded as a limitation on the scope of the claim.

Therefore, while a presently preferred form of the improved propellant supply device has been shown and described, and several modifications thereof discussed, persons skilled in this art will readily appreciate that various additional changes and modifications may be made without departing from the spirit of the invention, as defined and differentiated by the following claims.

What is claimed is:

1. A propellant supply device for a vehicle having a main propulsion motor and having an attitude control system including a plurality of thrusters, comprising:
   a pressure vessel;
   first and second movable walls operatively arranged within said pressure vessel and dividing the interior space therewithin into three separate chambers from each of which fluid may be supplied;
   a first fluid in one of said chambers;
   a second fluid in a second of said chambers; and
   a third fluid in a third of said chambers, said third fluid being a volatile liquid having a liquid phase and a gaseous phase, and wherein all three chambers are pressurized to the vapor pressure of said third fluid.

2. A propellant supply device as set forth in claim 1 wherein said third chamber is between said movable walls.

3. A propellant supply device as set forth in claim 1 wherein said first and second fluids are bipropellants that are adapted to be supplied to said main propulsion motor.

4. A propellant supply device as set forth in claim 3 wherein the ratio of fluids discharged from said first and second chambers is substantially constant.

5. A propellant supply device as set forth in claim 1 wherein said third fluid is ammonia.

6. A propellant supply device as set forth in claim 1 wherein said third fluid is arranged to communicate with said thrusters.

7. A propellant supply device as set forth in claim 1 wherein said movable walls have the same effective spring rate.

8. A propellant supply device as set forth in claim 1 wherein said movable walls have the same effective area.

9. A propellant supply device as set forth in claim 1 wherein each movable wall is a bellows.

10. A propellant supply device as set forth in claim 1 wherein said movable walls are so configured and arranged that said first and second fluid are pressurized equally by said third fluid.

11. A propellant supply device as set forth in claim 1 wherein said propellant supply device is so configured and arranged that its center of gravity remains substantially fixed independently of the volumes of said fluids.

12. A propellant supply device as set forth in claim 1 wherein said first and second fluids are the same.

13. A propellant supply device as set forth in claim 12 wherein said first and second fluids are a monopropellant.

* * * * *